United States Patent [19]

Pettersson

[11] Patent Number: 5,505,004
[45] Date of Patent: Apr. 9, 1996

[54] MACHINE FRAME

[75] Inventor: Bo Pettersson, Torshälla, Sweden

[73] Assignee: C E Johansson AB, Eskilstuna, Sweden

[21] Appl. No.: 260,921

[22] Filed: Jun. 15, 1994

[30] Foreign Application Priority Data

Jun. 18, 1993 [SE] Sweden ................... 9302119

[51] Int. Cl.$^6$ .................................. G01B 5/008
[52] U.S. Cl. .................................. 33/503; 33/1 M
[58] Field of Search .................. 33/503, 504, 1 M

[56] References Cited

U.S. PATENT DOCUMENTS

| | | | |
|---|---|---|---|
| 3,386,174 | 6/1968 | Leach et al. | 33/503 |
| 4,597,182 | 7/1986 | Rinn | 33/503 |
| 4,782,598 | 11/1988 | Guarini | 33/503 |
| 4,908,951 | 3/1990 | Gurny | 33/503 |
| 4,910,446 | 3/1990 | McMurtry et al. | 33/503 |
| 5,119,566 | 6/1992 | Schalz et al. | 33/503 |
| 5,287,629 | 2/1994 | Pettersson | 33/503 |

FOREIGN PATENT DOCUMENTS

| | | | |
|---|---|---|---|
| 82441 | 6/1983 | European Pat. Off. | 33/503 |
| 238711 | 11/1985 | Japan | 33/503 |

*Primary Examiner*—Thomas B. Will
*Attorney, Agent, or Firm*—Nies, Kurz, Bergert & Tamburro

[57] ABSTRACT

The present invention relates to a machine frame, and particularly but not exclusively, to a machine frame for so-called coordinate measuring machines of the kind which include at least one first portal that includes two parallel, vertical first and second legs (7, 8) which are rotationally and flexurally rigid in relation to a base member (10). The legs support a horizontal beam (11) on which there is movably supported a rod, bar or the like for supporting a measuring head, tool or corresponding device. The horizontal beam (11) is connected to the first leg (8) by a pivot joint (13) which permits the beam (11) to rotate in the vertical plane of the legs (7, 8), and is connected to the second leg (7) by a connection (14) which permits the beam (11) to rotate in this vertical plane and also to move in the direction of its longitudinal axis in relation to the second leg. The invention also relates to a method of determining the geometry of the portal occasioned by deformation of such machine frames.

15 Claims, 4 Drawing Sheets

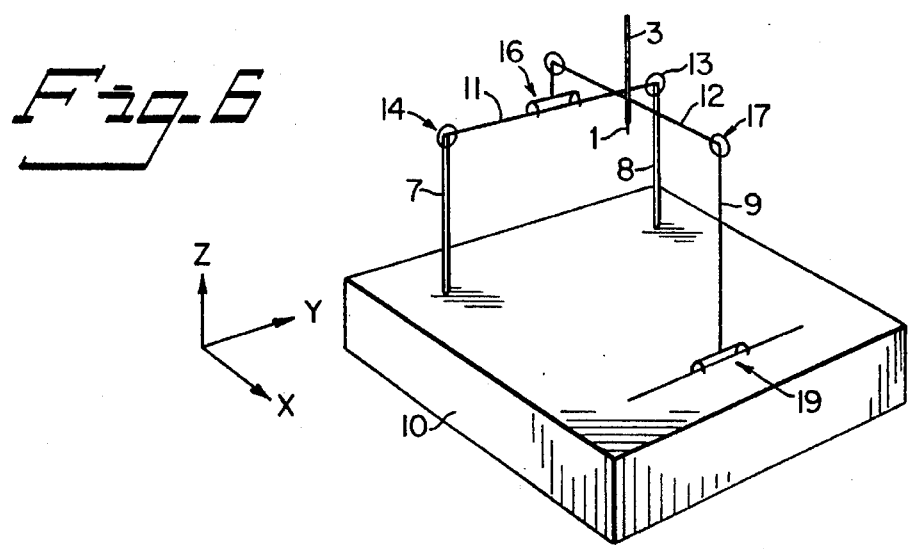
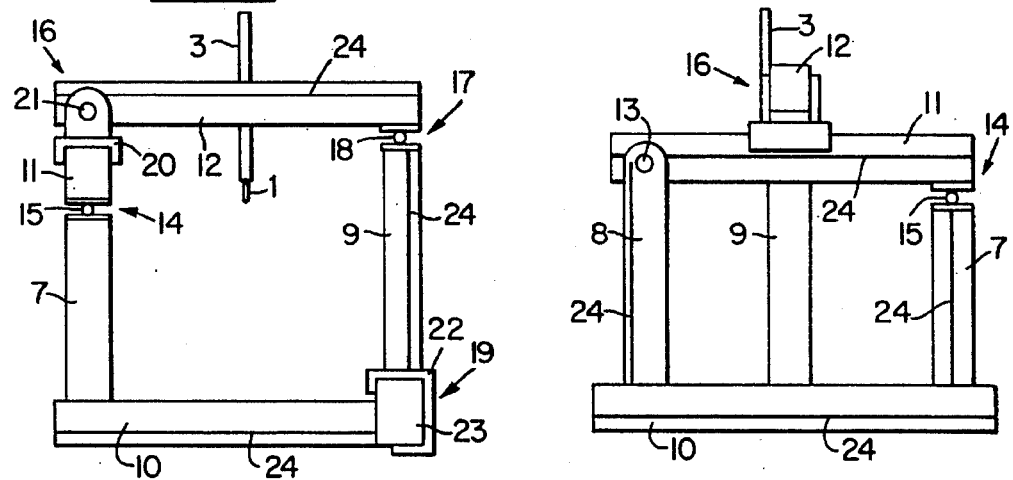
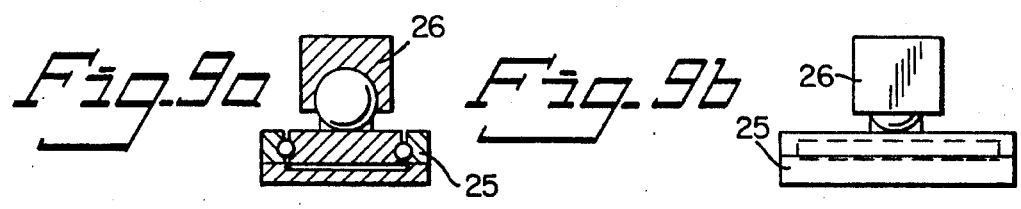
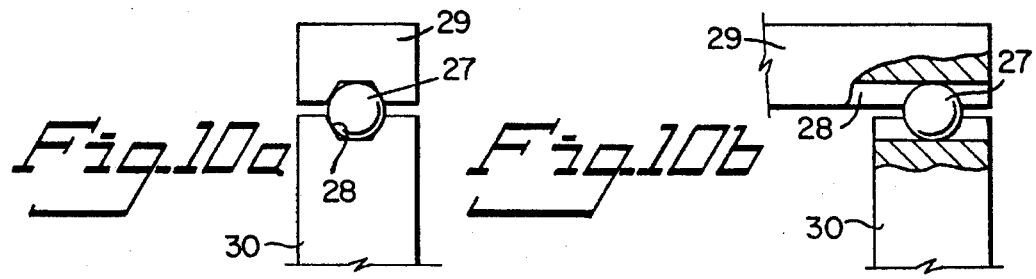

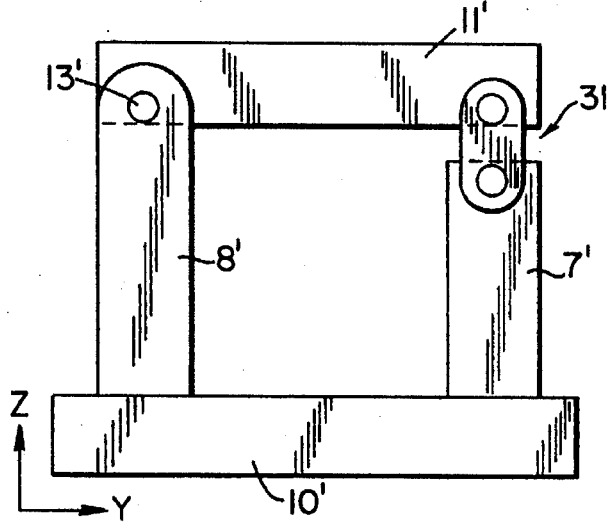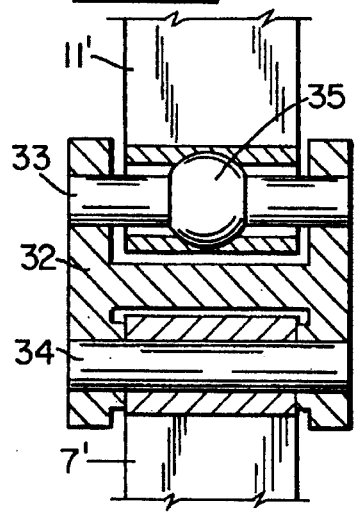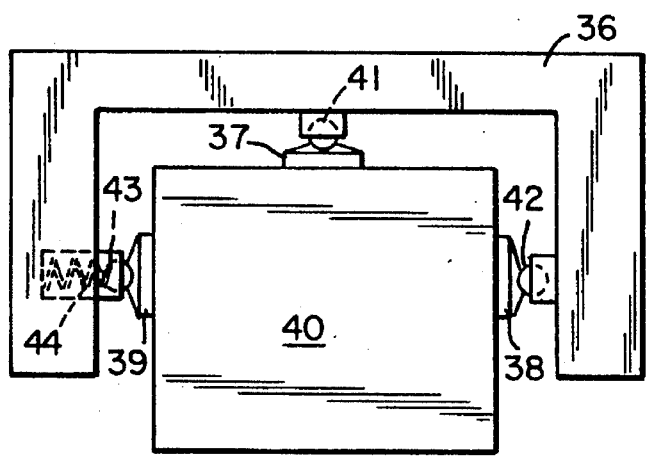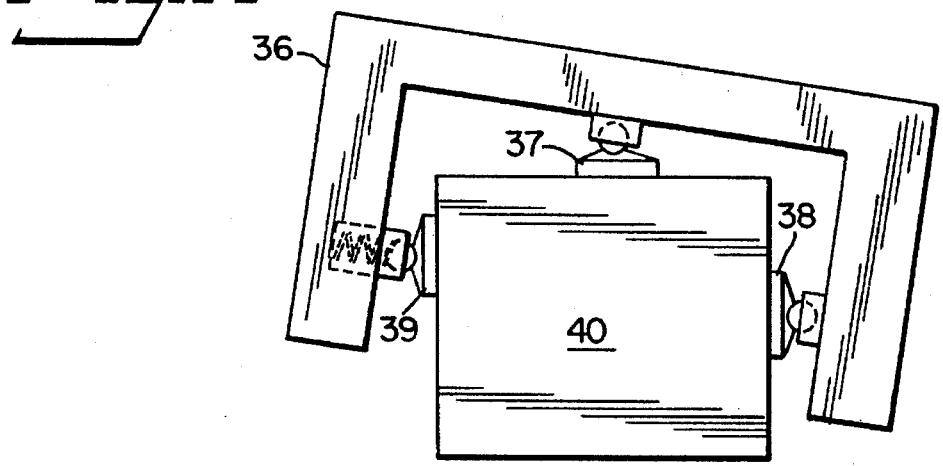

MACHINE FRAME

BACKGROUND OF THE INVENTION

1. Field of the Invention

The present invention relates to a machine frame and particularly but not exclusively, to a frame structure for so-called coordinate measuring machines, comprising at least one first portal which includes two mutually parallel vertical first and second legs which are rotationally and flexurally rigid in relation to a base member and which support a horizontal beam on which a rod or the like which is intended to carry a measuring head, a tool or corresponding device is displaceably mounted. The invention also relates to a method for determining the geometry of the portal determined by deformation of the frame.

2. Description of the Related Art

Coordinate measuring machines are used to measure-up the shape of objects, wherein a large number of points on the object are measured up with regard to their position in a three-dimensional coordinate system, which is defined by the machine. A coordinate measuring machine comprises a measuring head which can be moved in three directions which extend at right angles to one another. The measuring head carries a measuring probe whose position relative to a surface of the object is determined in a coordinate system which is defined by the aforesaid three mutually perpendicular directions. Such coordinate measuring machines are highly accurate in operation and consequently any deformation in the various parts of the machine will influence the measuring result.

Traditionally, efforts have been made to solve this problem by constructing the machine frame from highly rigid and firmly connected components so that any deformations that occur can be ignored. Because of the precision required of such machines in present times, a solution of this nature results in bulky and extremely expensive constructions.

SE-B-468,727 and U.S. Pat. No. 5,119,566 teach other solutions to this problem. These solutions are based on the principle of allowing certain deformations in the machine frame but to construct the frame in a manner which will enable these deformations to be readily calculated and the measuring result corrected on the basis of calculated deformations.

The present invention is also concerned with solving the problem of the effect that deformation of the frame has on the measuring result, by constructing the frame in a manner which will enable deformations to be measured and calculated more easily than in the case of earlier known coordinate measuring machines, so as to enable the measuring result to be corrected in a simple and reliable manner with regard to all deformations that occur, and so that temperature deformations will not induce stresses or force-moments in the construction.

SUMMARY OF THE INVENTION

This object is achieved in accordance with the invention with a machine frame of the kind defined in the introduction which is characterized in that the horizontal beam is connected to the first leg by means of a pivot connection which permits the beam to rotate in the vertical plane of the legs, and is connected to the second leg by means of a connection which permits the beam to rotate in said vertical plane and also enables the beam to move relative to the second leg in the longitudinal direction of said beam.

According to one preferred embodiment of the invention, the rod carrying the measuring head is carried displaceably on an overlying crossbar which is supported at one end on the horizontal beam and is movable in the longitudinal direction of said beam at right angles to the longitudinal axis of the overlying crossbar and is able to rotate in a vertical plane that extends at right angles to the longitudinal axis of the horizontal beam. That end of the overlying crossbar which is opposite to the end connected to the horizontal beam is carried by a third vertical leg y means of a connection which permits the crossbar to move relative to the third vertical leg in the longitudinal direction of the crossbar, and also allows the crossbar to rotate in a vertical plane parallel with a vertical plane through the portal, with which the opposite end of the crossbar is connected, and in a vertical plane extending at right angles to this plane. The construction also includes length measuring devices for measuring the length of the frame components, a measuring device for measuring outward flexing or bending of the first leg, and means for measuring the outward flexing or bending of the second leg in a direction at right angles to this leg and to the plane that contains the first and the second frame legs.

The present invention also relates to a method of determining portal geometry occasioned by deformation in a machine frame, particularly a machine frame for so-called coordinate measuring machines of the kind which include at least one first portal which includes two parallel, vertical first and second legs which are rotationally and flexurally rigid in relation to a base member and which carry a horizontal beam which movably carries a rod or like device for supporting a measuring head, a tool or some corresponding device. The connecting the horizontal beam to the first leg by means of a pivot connection which will allow the beam to rotate in a vertical plane containing said legs, and by connecting the horizontal beam with the second leg by means of a connection which will allow the beam to rotate in said vertical plane and also allow the beam to move in relation to the second leg in the longitudinal direction of the beam; and measuring the absolute lengths of the vertical legs and the base member along a line which coincides with the projection of the horizontal beam.

According to one embodiment of this method, outward bending of the horizontal beam is calculated in accordance with the position of the rod-carried measuring head in accordance with the elementary case of a straight beam supported on two supports and loaded with a punctiform load. The machine frame is constructed so that all horizontal beams are connected at their ends with supporting components by means of connections such that both beam ends will be able to rotate or turn in a vertical plane that passes through the longitudinal symmetry plane of respective beams and one end is displaceable in the longitudinal direction of the beam, wherein downward bending of the horizontal beams is calculated in accordance with the elementary case of a straight beam which rests on two supports and which is loaded with a punctiform load. One advantageous variant involves measuring outward bending of the first and the second legs of each portal.

BRIEF DESCRIPTION OF THE DRAWINGS

The invention will now be described in more detail with reference to an exemplifying embodiment of the invention and also with reference to the accompanying drawings which illustrate different cases of deformation and in which

FIG. 6 is a highly schematic perspective view of a machine frame according to one embodiment of the invention;

FIGS. 7 and 8 illustrate the frame of FIG. 6 from one side and from the rear respectively;

FIGS. 9a and 9b are respectively a cross-sectional view and a side view of a first embodiment of a pivot connection that can be used in an inventive machine frame;

FIGS. 10 and 10b illustrate a second embodiment of a pivot connection that can be used in an inventive machine frame;

FIG. 11 illustrates a variant of the machine frame shown in FIG. 6 which includes a third embodiment of a pivot connection that can be used in an inventive machine frame;

FIG. 12 is a cross-sectional view of the pivot connection shown in FIG. 11, in larger scale;

FIGS. 13 and 14 illustrate a fourth embodiment of a pivot connection that can be used in an inventive machine frame, and shows the connection in two different states or positions;

DESCRIPTION OF THE PREFERRED EMBODIMENTS

Figure 1:
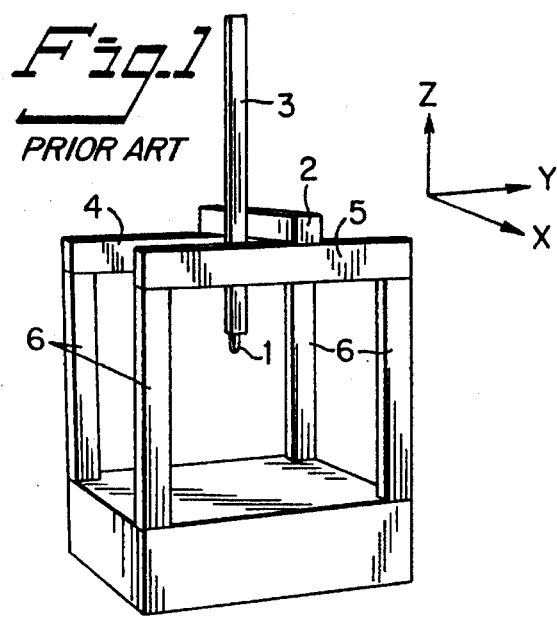
FIG. 1 illustrates a known coordinate measuring machine.

FIG. 1 illustrates schematically a first type of coordinate measuring machine, namely a Gantry type machine. A measuring probe 1 can be moved along three coordinate axes X, Y and Z at right angles to one another. The machine includes four vertical legs 6 on which two beams 4, 5 are fixedly mounted. A crossbar 2, also in the form of a beam, can be moved along the beams 4, 5 in the direction of their longitudinal axes, i.e. in the Y-direction. A rod or bar 3 is movably attached to the crossbar 2 so as to be movable in a vertical direction, i.e. in the Z-direction, and also so that it is able to move along the crossbar 2 in its length direction, i.e. in the X-direction.

The measuring probe 1 is mounted on the bottom of the rod or bar 3. The beams 4, 5, the crossbar 2 and the rod 3 are provided with measuring scales which are mounted in direct connection with the beams and the crossbar, so as to indicate the mutual position which indicates the position of the probe 1 in the coordinate system.

Since a coordinate measuring machine is intended to determine the measurements of an object to be measured with extreme accuracy, it is essential to know the extent to which the beam system is deformed under different conditions and in different circumstances, so as to be able to adjust the measuring results with the aid of a correction determined on the basis of such deformation.

The deformations can be divided into three main types according to cause:

1. Static deformation caused by shifting the center-of-gravity of the mobile X, Y, Z system.

2. Dynamic stresses caused by mass forces that are generated when accelerating the mobile X, Y, Z system.

3. Changes caused by the change in temperature of the beam system.

It is intended to construct a machine frame in accordance with the present invention, so that all three types of deformation can be observed in the correction.

The deformations give rise to changes in machine geometry and in beam straightness, and also result in a shift in the position of the origin of the coordinate system.

A description of the deformations that occur in a measuring machine of the aforesaid Gantry type comprising horizontal beams 4, 5 and legs 6 will be given below, even though the principles are applicable to other types of coordinate measuring machines.

Figure 2:
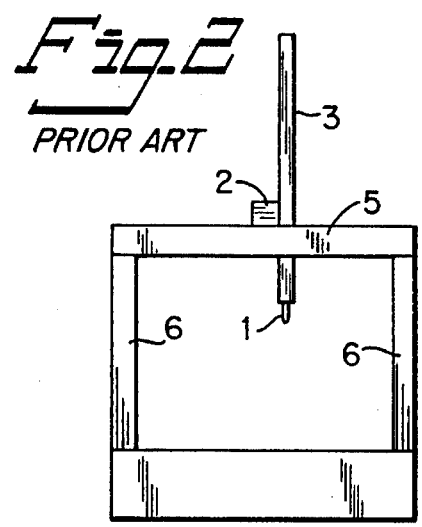
FIG. 2 illustrates the machine of FIG. 1 seen from one end thereof.

FIG. 2 illustrates schematically the coordinate measuring machine shown in FIG. 1, and shows the machine from one end-wall in FIG. 1. As a result of the weight of the X/Z-system 2, 3, the end-wall of the machine will be deformed in the manner shown greatly exaggerated in FIGS. 3a and 3b. As will be seen when comparing FIG. 3a with FIG. 3b, the deformation that occurs is contingent on the position of the X/Z-system 2, 3 along the beam 5. It will be seen from FIG. 3b that all positions which do not coincide with the symmetry position along the beam 5 will result in non-coincidence of the rod with the vertical. This means that the measuring probe will be displaced in both the Z-direction and the X-direction.

Figure 4:
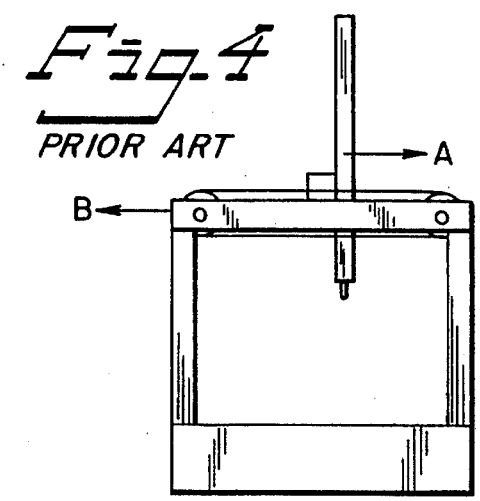

When the X/Y-system 2, 3 is accelerated in the direction of the arrow A in FIG. 4, there is generated in the beam system 5, 6 a reaction force which tends to deform the end wall in the opposite direction, in the direction of the arrow B, or in the other direction, depending on how the drive is arranged. This results primarily in shifting of the origin of the system in one of these directions.

Naturally, having knowledge of the weight of the mobile system 2, 3, its position along the Y-axis and the instantaneous acceleration, it would be quite possible to calculate theoretically the occurrent deformation of the machine end-wall at each moment in time. In practice, however, the calculations that must be carried out in this regard are highly complicated and uncertain. For instance, the legs 6 are flexurally loaded with torque generated by bending of the beam 5, which in turn is subjected to bending as a result of load propagation, punctiform loading and torque. This must also be added to the influence exerted by dynamic loads.

In reality, the deformation may also be influenced by inhomogeneous material parameters, such as beam wall thickness, variations in mechanical strength properties, etc. It is thus extremely difficult to obtain reliable values of the acceleration of the movable system.

Figure 5:
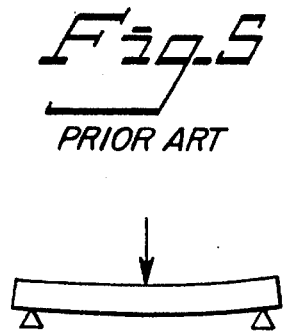
FIG. 5 illustrates a simple loading case.

In a system according to FIG. 5, in which the beam is a freely supported beam, the calculation problem is reduced statically to a simple elementary case.

The object of the invention is to construct the frame of a coordinate measuring machine in the most practical manner in which bending loads on the frame components are avoided and so that unavoidable bending loads can be calculated to a high degree of accuracy in accordance with the elementary case of a straight beam resting on two supports and loaded with a punctiform load.

One embodiment of a machine frame thus constructed is shown in FIGS. 6–8.

This frame includes three vertical legs 7, 8 and 9 which are mounted on a base member 10. The vertical legs 7 and 8 support therebetween a horizontal beam 11 which, together with the vertical leg 9, supports an overlying crossbar 12. The overlying crossbar 12 carries a rod or bar 3 which is provided with a measuring probe, and which coincides with the rod or bar 3 described with reference to FIGS. 1–4.

Both the vertical leg 7 and the vertical leg 8 are fixedly mounted to the base member 10. One end of the horizontal beam 11 is connected to the fixed vertical leg 8 by means of a pivot connection 13 of some appropriate type which will allow the beam 11 to rotate or turn in an Y-Z-plane, while the other end of the beam 11 is connected to the leg 7 by means of a connection 14 which will allow the beam 11 to rotate or turn in a Y-Z-plane and which will permit translatory movement of the beam 11 in the Y-direction relative to the leg 7. This connection may also conveniently be designed to permit the beam 11 to rotate in the X-Z-plane, so as to avoid any skewing or warping of the beam to result in the introduction of stresses in the legs and the beam when mounting the beam. In its simplest form, this connection 14 may consist of a ball 15 placed between the ends of the leg 7 and the beam 11 respectively.

One end of the overlying crossbar 12 is connected to the horizontal beam 11 by means of a connection 16 which enables the crossbar to move in the length direction of the beam 11, i.e. in the Y-direction, and which also permits the crossbar to rotate in an X-Z-plane. The other end of the overlying crossbar is connected to the vertical leg 9 by a connection 17 which permits the crossbar 12 to rotate relative to the leg 9 in an X-Z-plane and which permits translatory movement of the crossbar in its length direction, i.e. in the X-direction. Similar to the beam 11, this connection will be constructed conveniently for rotation in all directions, and in its simplest form may also consist of a ball 18. The vertical leg 9 is connected to the base member 10 by journal means 19 so as to be rotationally and flexurally rigid with said base member but linearly displaceable in the Y-direction. The construction also includes guide means, for instance guide flanges, which prevent the overlying crossbar 12 moving in the Y-direction relative to the leg 9.

In the illustrated exemplifying embodiment, the connection 16 has the form of a bracket means 20 journalled for movement on the beam 11, said bracket means being connected to the crossbar 12 by some suitable form of pivot 21.

The connection 19 is comprised of a bracket means 22 which is fixedly connected to the vertical leg 9 and which is journalled for movement on a guide beam 23 included in the base member 10.

The bracket means 20 and 22 are preferably journalled on the beams 11 and 23 respectively with the aid of air bearings, although other types of bearings are, of course, conceivable within the scope of the invention.

In the case of a coordinate measuring machine according to FIGS. 6–8, the static deformation of the portal comprised of the vertical legs 7 and 8 and the horizontal beam 11 is composed of downward bending of the beam 11 and linear compression of the legs 7, 8. The static deformation of the components of this portal can thus be divided into elementary loading cases and can therewith be easily calculated for different positions of the crossbar 12 carrying the measuring probe.

Figure 3A:
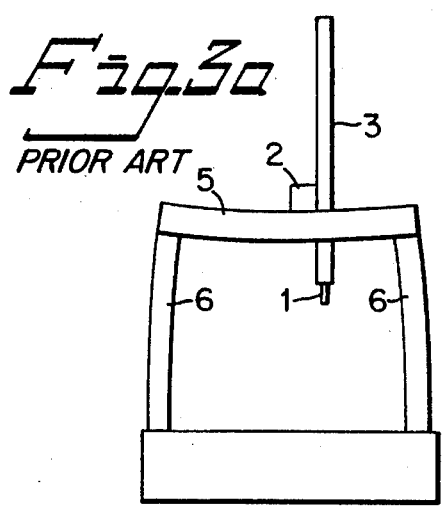
FIGS. 3a, 3b and 4 illustrate different loading cases.
Figure 3B:
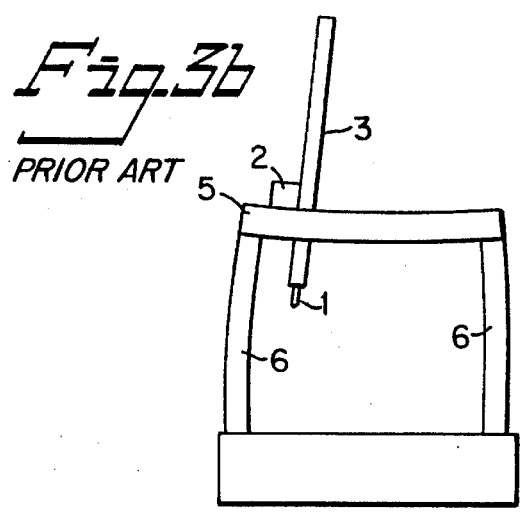

It is pointed out in this regard that in the case of static, indefinite systems, for instance the coordinate measuring machine illustrated in FIGS. 1–3, temperature gradients and varying positions of the movable punctiform loads 2, 3 will result in deformations such as those shown in FIGS. 3a and 3b, which result in shifting of the origin of the coordinate system. It is extremely difficult to determine the magnitude of this shift, particularly when temperature gradients and movable loads occur simultaneously, which is more often the case.

Those horizontal forces which bend the legs and therewith also shift the origin of the coordinate system are eliminated substantially completely by constructing the joints or connections in the frame of a coordinate measuring machine so that the two legs of the portals included by the frame are connected to the overlying crossbar by a pivot connection and by a combined pivot and slide connection, as described in the aforegoing. This will result in an 80%-improvement in the stability of the machine, i.e. reproduceability of the measurements and calibration, solely by measuring the changes in length of the legs and the beams, without measuring or calculating outward bending of the legs and beams.

It will be understood that measurement or calculation of the beams and legs will enable machine stability to be further improved, and the aforedescribed machine construction simplifies the measuring and/or calculating processes required to this end.

The dynamic deformation of the leg 8 of the portal configured by the vertical legs 7 and 8 and the horizontal beam 11 can be determined to a high degree of accuracy as though a punctiform load was accelerated or retarded during its movement along the beam 11. Under these assumptions, the outward bending or flexing of the leg 8 as a result of the dynamic loads to which the portal comprised of the legs 7, 8 and the beam 11 is subjected can be readily calculated or measured. Temperature deformation is expressed solely as changes in length of the portal components and does not induce stresses in the portal. This deformation can thus be readily determined, by measuring the absolute length of the portal component.

For the purpose of determining the static deformation of the overlying crossbar 12 and the displaceable leg 9, the aforesaid portal 7, 8, 11 can be considered as a fixed leg having a length corresponding to the distance of the downwardly bent beam 11 from the base member, and the static deformation of the overlying crossbar 12 and the leg 9 can be calculated as the same elementary case as that for corresponding components of the aforesaid portal 7, 8, 11.

The dynamic loads occurrent when moving the overlying crossbar in the Y-direction primarily cause the crossbar to endeavour to twist in the X-Y-plane, and the bracket means 20 transmits this torsional force to the beam 11. Transmission of torsional stresses to the leg 8 can be avoided by providing the leg 8 with a pivotal connection which in addition to being capable of rotation in the Y-Z-plane is also capable of rotation in the X-Y-plane. Thus, in one alternative embodiment, the connection 13 is replaced with a ball coupling. In this case, the connection 21 is omitted and the bracket means 20, which is rotationally rigid on the beam 11, and the overlying crossbar will be mutually connected in a rotationally rigid manner. Any rotary movement due to changes in the length of the leg 9, for instance, will then occur around the ball coupling between the leg 8 and the beam 11 and the connection 14 respectively.

Movement of the system origin due to outward bending of the leg 8 in the X-direction and the Y-direction respectively can be readily measured or calculated, since the complex loading cases encountered with fixedly mounted beams have been reduced to simpler loading cases by the present invention.

The dynamic loads that occur when moving the probe-carrying rod (not shown) along the overlying crossbar 12, i.e. in the X-direction, will not influence the leg 9, but will result only in movement of the crossbar in the X-direction and rotation of the bracket means 20 about a Y-axis and can be readily calculated or measured. It will be noted that the effect of this rotation on the measuring result is negligible in this regard.

One method of avoiding torsion of the beam 11 is to replace the pivot connection 21 and the rotationally rigid journal 20 with a journal or bearing which is not rotationally rigid, for instance the bearing described with reference to FIGS. 13 and 14. Torsion of the beam 11 can also be avoided when the connection 13 has the form of a ball coupling, as earlier mentioned. Movement of the system origin can be readily determined by measuring-up the outward bending of the leg 8 in the X-direction and the Y-direction, and outward bending of the leg 7 in the X-direction. Alternatively, outward bending of the legs can be calculated, because the complex loading cases occurrent in fixedly mounted beams have been reduced to simpler loading cases.

Temperature deformations occurring in the overlying crossbar 12 and the leg 9 will also only manifest themselves in changes in the lengths of these elements, which can be readily measured.

Because the aforedescribed machine frame is constructed so that temperature deformations will not induce force moments or tensions in the construction and therewith do not give rise to forces that are difficult to determine, as would otherwise be the case, it is possible to correct the measuring result caused by occurrent deformations of all types without needing to perform complicated calculations, provided that the lengths of the frame components are measured continuously. For this reason, each frame component is provided with length measuring means 24, as illustrated schematically in FIGS. 7 and 8. These lengthmeasuring means 24 may conveniently be comprised of invarbased measuring probes in accordance with SE-B-466,518, to which reference is made for a more detailed description of the construction of such probes, although it will be understood that other types of length-measuring devices may also be used.

The leg 8 will preferably be of such rigidity or stiffness as to render deformation due to dynamic loads so small as to be negligible, and the bearings of the bracket means 20, 22 may be made so rotationally rigid in the X-Y-plane that bearing oscillations in this plane will be negligibly small. This reduces occurrent deformations to solely length changes, which are measured with the aid of the measuring devices 24, and bending of the beams which can be determined with the aid of elementary beam theory. Measured positional values can be easily corrected, once having determined the deformations.

In order to prevent a shift of the system origin point as a result of bending of the leg 8 in response to dynamic loads at high acceleration forces, the leg must be given very powerful dimensions. In order to avoid giving the leg 8 excessively powerful dimensions with the intention of preventing shifting of the system origin, it can be permitted for the leg 8 to bend and bending of the leg 8 in the Y-direction and the X-direction can be measured by means of a sensor, in accordance with one variant of the described embodiment. The sensor may be constructed to act between the leg 8 and a reference beam which has a position relative to the base member 10 that has been determined to a very high degree of exactness. Alternatively, the deformation can be measured with the aid of an optic sensor or an electronic contactless sensor. It may also be appropriate, particularly in the case of high accelerations, to measure bending of the leg 7 in the X-direction. The machine frame is thus provided with such sensors in one variant of the invention.

Known methods, such as optical methods, inductive methods or capacitive methods may be used conveniently to measure the aforesaid parameters. Such measuring techniques are well known and will not therefore be described in this document.

FIGS. 9–14 illustrate different types of connections which, similar to the connections 14 and 17, permit translatory movement in one direction and rotational movement in two planes extending at right angles to one another.

FIGS. 9a and 9b are respectively a sectional view and a side view of a connection which is comprised of a linear bearing 25, for instance a ball or roller table-journal of standard type which is provided with a ball joint 26. This connection can replace the connections 14 and 17 with the ball joint fixedly attached to the beam 11 or to the overlying crossbar 12 and the linear journal fixedly mounted on the leg 7 or the leg 9.

FIGS. 10a and 10b are respectively a front view and a partially cut-away side view of a connection which differs from the connection arrangements 14 and 17 shown in FIGS. 7 and 8 solely by virtue of a ball 27 which runs in V-shaped grooves 28 formed in those elements 29, 30 to be connected, e.g. the leg 7 and the beam 11.

FIG. 11 illustrates a portal corresponding to the portal 7, 8, 11 shown in FIGS. 6–8, wherein those portal components shown in FIG. 11 that find correspondence in FIGS. 6–8 have been identified by the same reference numerals with the inclusion of a prime sign. In the portal 7', 8', 11', the leg 7' and the beam 11' are connected by means of a joint 31 which permits the same movements as the connection 14 and which is shown in cross-section in larger scale in FIG. 12. As will be seen from FIG. 12, the connection 31 has the form of a link 32 of H cross-section and two pivot pins 33, 34 which pass through opposing ends of the link legs and through apertures provided in the ends of the beam 11' and the leg 7'. The center region of the pivot pin 33 has the form of a ball 35 and the recess in the beam 11' has a shape which is complementary to the ball. The beam 11' can be moved in the X-direction, by rotating the link 32 on the pins 33, 34, and is able to rotate in a Y-Z-plane on the pin 33 and in an X-Z-plane on the ball 35.

FIG. 13 illustrates a bracket means 36 which is able to slide along a beam 40 or like structural member on air bearings 37, 38, 39 in a direction at right angles to the plane of the paper. The air bearings are joined to the bracket means 36 through ball joints 41, 42, 43, and the ball joint 43 and associated air bearing 39 have been made resilient with the aid of a spring device 44. The bracket means 36 is therewith not rotationally rigid and is able to slide along the beam 40 and also to rotate or twist in the plane of the paper, as illustrated in FIG. 14, and in a plane at right angles thereto.

Figure 15:
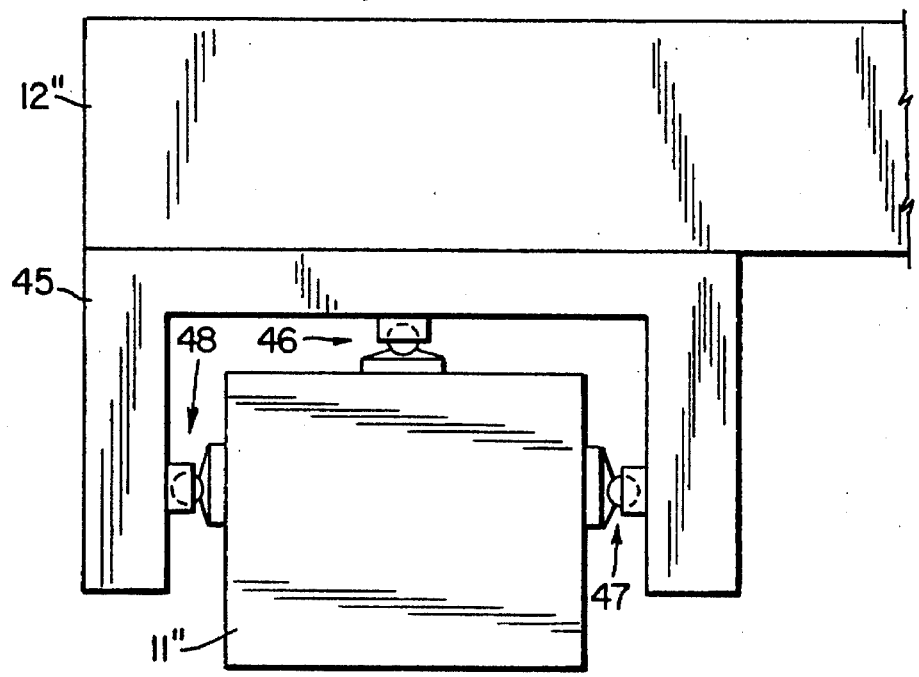
FIG. 15 illustrates a variant of the pivot connection shown in FIGS. 13 and 14.

FIG. 15 illustrates a variant of the connection shown in FIGS. 13 and 14, in which a bracket means 45 which carries three sets of bearings 46, 47, 48 forms a connection between a beam 11" corresponding to the beam 11 in FIGS. 6–8 and an overlying crossbar 12" corresponding to the crossbar 12 in FIGS. 6–8. Each set of bearings 46, 47, 48 is comprised of two bearing units arranged mutually sequentially in the length direction of the beam 11", and similar to the bearing units shown in FIGS. 13 and 14, each of said bearing units is comprised of an air bearing provided with a ball joint. A connection of this nature allows the overlying crossbar 12" to turn in the plane of the paper, in addition to allowing the crossbar to move linearly along the beam 11'.

Figure 16:
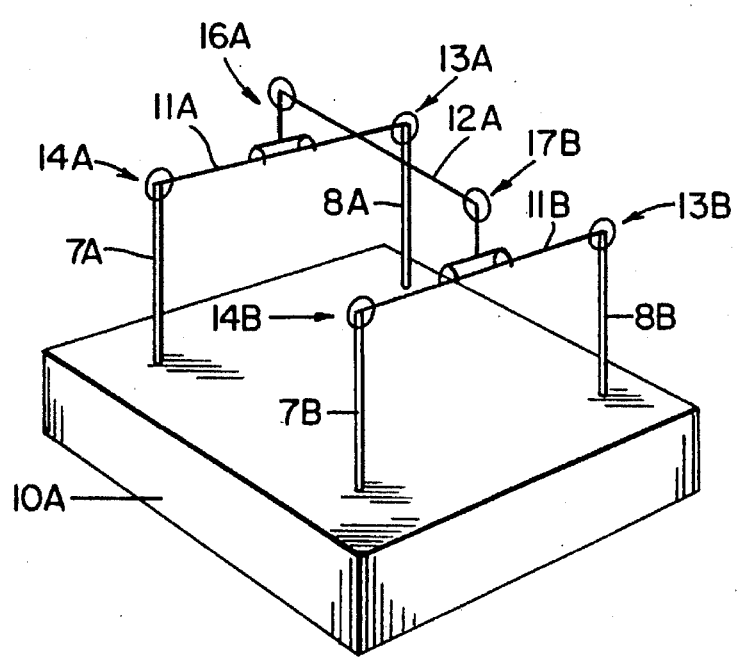
FIG. 16 is a schematic perspective view of a second embodiment of an inventive machine frame.

FIG. 16 illustrates a second embodiment of a coordinate measuring machine. This second embodiment differs from the embodiment illustrated in FIGS. 6–8, by virtue of the fact that the displaceable leg 9 included in the embodiment shown in FIGS. 6–8 has been replaced with a fixed portal 7B, 8B, 11B. Those components in the FIG. 16 embodiment that find correspondence in FIGS. 6–8 have been identified with the reference numerals followed by an A-suffix or a B-suffix. The mass of the movable or displaceable parts of the frame is lower in the FIG. 16 embodiment than in the embodiment illustrated in FIGS. 6–8, meaning that the dynamic loads will be smaller.

It is pointed out in this regard that the length changes and rotational movement occurring in the frame of a coordinate measuring machine constitute fractions of a millimeter and fractions of a degree respectively.

It will be understood that the described and illustrated exemplifying embodiments of the measuring machines can be modified within the scope of the present invention and can also be applied to other types of coordinate measuring machines, for instance machines with which the frame has only one portal or a frame having a movable portal. The invention can also be applied to machines other than measuring machines of the aforedescribed kind. For instance, the invention can be applied to any type of machine that includes a frame that can be brought into accurate alignment with an object, for instance an object to be worked or machined. In this regard, the invention can be applied in the aforedescribed and following manner to calculate deformations occurring in the machine frame, whereafter corrections are made, for instance, to the position of a working tool in relation to the object. The present invention is therefore not restricted to application with any particular type of machine, even though the invention is primarily intended for application on measuring machines.

I claim:

1. A machine frame, and particularly but not exclusively, for so-called coordinate measuring machines, comprising at least one first portal which includes two parallel, vertical first and second legs which are rotationally and flexurally rigid in relation to a base member, a horizontal beam carried by said legs, and a rod member carried by the horizontal beam and which movably supports a measuring tool, wherein the horizontal beam is connected to the first leg by means of a pivot connection which permits the beam to rotate in a first vertical plane defined by the first and second legs, and wherein the horizontal beam is connected to the second leg by means of a connection which permits the beam to rotate in said first vertical plane and to move in the length direction of said beam in relation to the second leg.

2. A frame according to claim 1, wherein the rod member supporting said measuring tool is movably supported on an overlying crossbar whose one end is supported on the horizontal beam for movement in the length direction of the beam at right angles to the length direction of the crossbar and is rotatable in a second vertical plane at right angles to the length direction of the beam.

3. A frame according to claim 2, wherein the end of the crossbar opposite to the end connected to the horizontal beam is carried by a third vertical leg by means of a connection which permits the crossbar to move in its length direction relative to the third vertical leg and to rotate in a vertical plane parallel with the first vertical plane, and also in a vertical plane at right angles to said first vertical plane.

4. A frame according to claim 2, wherein the end of the crossbar opposite to the end that is connected to the horizontal beam is supported by a second portal which is identical to the first portal.

5. A frame according to claim 1, wherein the connection between the second leg and the horizontal beam also permits rotation about an axis extending in the length direction of the beam.

6. A frame according to claim 5, wherein the connection between the first leg and the horizontal beam also permits rotation about an axis extending in the length direction of the beam.

7. A frame according to claim 5, wherein the connections between the beam and the first and the second legs permit rotation in all planes.

8. A frame according to claim 1, including length-measuring means operatively connected with the legs and the beam for measuring changes in their length.

9. A frame according to claim 1, including measuring means for measuring outward bending or flexing of the first leg.

10. A frame according to claim 9, including means for measuring the bending or flexing of the second leg.

11. A frame according to claim 2, including length-measuring means operatively connected with the legs, the beam, and the crossbar for measuring changes in their length.

12. A method for determining portal geometry occasioned by deformation of a machine frame, particularly but not exclusively a machine frame for so-called coordinate measuring machines of the kind which include at least one first portal including two parallel and vertical first and second legs which are rotationally and flexurally rigid in relation to a base member and which support a horizontal beam on which a rod member for supporting a measuring tool is movably mounted, said method comprising: connecting the horizontal beam to the first leg by means of a pivot which permits the beam to rotate in a vertical plane containing the legs, connecting the horizontal beam to the second leg by means of a connection which permits the beam to rotate in said vertical plane and also permits the beam to move in its length direction relative to the second leg, and measuring the absolute lengths of the vertical legs and the absolute length of the base member along a line which coincides with the projection of the horizontal beam.

13. A method according to claim 12, including calculating the extent to which the horizontal beam bends as a result of the position of the measuring tool in accordance with the elementary case of a straight beam supported on two supports and loaded with a punctiform load.

14. A method according to claim 13, including constructing the machine frame in a manner such that the ends of said horizontal beam will be connected with supporting components by means of connections that permit both ends of said horizontal beam to rotate in a vertical plane through the length symmetry plane of said horizontal beam, and such that one end is able to move in the length direction of said horizontal beam, and calculating downward bending of the horizontal beam in accordance with the elementary case of a straight beam supported on two supports and loaded with a punctiform load.

15. A method according to claim 12, including measuring outward bending of said first leg of said portal.

* * * * *